United States Patent [19]

Guyot et al.

[11] Patent Number: 5,464,641
[45] Date of Patent: Nov. 7, 1995

[54] SIZE REDUCTION OF OFFAL LOAVES TO CUBES

[75] Inventors: Dominique Guyot; Rémi Thevenot, both of Amiens, France

[73] Assignee: Nestec S.A., Vevey, Switzerland

[21] Appl. No.: 52,884

[22] Filed: Apr. 26, 1993

[30] Foreign Application Priority Data

May 29, 1992 [EP] European Pat. Off. ............... 92109043

[51] Int. Cl.⁶ .............................. A23N 17/00; B26D 7/10; B26D 9/00
[52] U.S. Cl. .................................. 426/241; 83/15; 83/39; 83/404; 426/524; 426/641; 99/451; 99/484; 99/537
[58] Field of Search ................... 83/15, 39, 404, 83/862, 865; 241/23, 65; 99/484, 537; 426/241, 524, 641

[56] References Cited

U.S. PATENT DOCUMENTS

| | | | |
|---|---|---|---|
| 3,350,971 | 11/1967 | Schneider | 83/404 X |
| 3,506,046 | 4/1970 | Webb | 83/404.3 X |
| 3,926,080 | 12/1975 | Beacher | 83/15 |
| 3,994,215 | 11/1976 | Rabeler | 99/484 X |
| 4,343,979 | 8/1982 | Barbini et al. | 99/451 X |
| 4,625,606 | 12/1986 | Pinegar et al. | 83/404 X |
| 4,791,002 | 12/1988 | Baker et al. | 426/641 |
| 4,919,951 | 4/1990 | Jenson et al. | 426/241 |
| 5,160,819 | 11/1992 | Ball et al. | 99/451 X |

FOREIGN PATENT DOCUMENTS

| | | | |
|---|---|---|---|
| 19916 | 12/1980 | European Pat. Off. | 426/241 |
| 26133 | 2/1984 | Japan | 241/23 |
| 5068474 | 3/1993 | Japan | 426/641 |
| 0450692 | 3/1991 | United Kingdom . | |

*Primary Examiner*—Rinaldi I. Rada
*Assistant Examiner*—Clark F. Dexter
*Attorney, Agent, or Firm*—Vogt & O'Donnell

[57] ABSTRACT

A loaf of offal having a temperature no higher than −10° C. is sliced to obtain slices having a thickness of between 6 cm and 15 cm and the slices then are passed through a microwave tunnel oven to heat-temper the slices to a temperature of from −5° C. to −9° C. The tempered slices then are size-reduced to chips and ten to cubes. Alternatively, the loaf is size-reduced to chips which are tempered as above and then, the heat-tempered chips are size-reduced to cubes. The units for slicing and size-reduction and the microwave tunnel oven are connected by conveyors.

10 Claims, 5 Drawing Sheets

SIZE REDUCTION OF OFFAL LOAVES TO CUBES

BACKGROUND OF THE INVENTION

This invention relates to frozen offal into cubes.

It is already known that frozen loaves of offal can be cut into cubes. To this end, the loaves are sliced and the slices obtained are passed through a system which cuts them into cubes. The disadvantage of this solution is that, on the one hand, the cubes obtained are not regular and, on the other hand, fines are obtained in too large a quantity to meet industrial requirements.

SUMMARY OF THE INVENTION

In the context of the invention, fines are understood to be small particles (1 mm to a few mm) of the starting materials used which are produced solely by the differences in cutting.

The problem addressed by the present invention was to provide a process for cutting frozen offal into regular cubes with a minimum of fines and with an output which would satisfy industrial productivity requirements.

According to the invention, it has been found that, to obtain regular cubes, the frozen offal loaves have to be tempered and brought to a temperature above −10°C.

Accordingly, the present invention provides process for cutting frozen offal into cubes, in which the frozen offal loaves with a temperature in the range of −24° C. to −10°C. of are cut into slices between 6 and 15 cm thick, the slices obtained are tempered by passage through a microwave tunnel so that they are brought to a temperature of the order of −5 to −9°C., after which the slices are reduced to chips and the chips obtained are reduced to cubes.

The invention also provides an apparatus assembly for carrying out the foregoing process comprising, successively positioned, a slicing unit, a microwave tunnel oven, a unit for cutting the slices into chips and a unit for cutting the chips into cubes and conveyor belts connecting the various units to one another. For passage through the tunnel oven, another conveyor belt is provided. Alternatively, passage through a microwave field may be considered.

In an alternate process embodiment of the invention, the frozen offal loaf first may be reduced to chips, and the chips obtained may be tempered by passage through the microwave tunnel oven so that upon leaving the tunnel oven, the chips are at a temperature of the order of from −4° to −6° C. and then the tempered chips are reduced to cubes. In this case, one step is saved.

In the case of the alternate process wherein the slicing step is omitted, an apparatus assembly according to the invention comprises, successively positioned, a unit for size-reduction to chips, a microwave tunnel oven and a unit for cutting the chips into cubes, conveyor belts still connecting the various units to one another.

DETAILED DESCRIPTION OF THE INVENTION

It has been found that, to meet productivity requirements, tempering by microwaves was the best solution for the cubing process according to the invention. The same is also true for reasons of the overall length of the production line. Thus, with microwaves, the production line does not have to exceed 20m in length.

Before they are cut into cubes, the slices are size-reduced to chips. The object of this is to enable the cubing unit to be charged with pieces of smaller size. Chips are understood to be pieces as wide as a hand with a thickness of 1 to 3 cm.

Slicing before passage through the microwave tunnel is carried out to reduce the temperature gradients in the frozen offal. It has been found that a slice thickness of up to 15 cm makes it possible to obtain the closest possible core and surface temperatures of the slices. It is above all the thickness of the slices, their shape and their initial temperature which are critical.

In the context of the invention, offal is understood to be both lobes of lungs and livers or kidneys of any type of animal intended for slaughter. Frozen products are understood to be those which have a temperature of −24 to −10°C. The frozen loaves are normally less than one meter in length with a thickness of the order of 20 cm. The key element of the process according to the invention is the tempering step in the microwave tunnel oven. It has been found that the pieces must leave the tunnel with a temperature of −5 to −9° C. to arrive at the cubing unit with a temperature of −3 to −6°C. Providing cubing is carried out at that temperature, the risk of fines being produced is truly minimized.

To ensure a reasonable overall length of the production line, the rate of passage through the microwave tunnel is calculated at 1 to 2 meters per minute to give an output of 500 to 5,000 kg/h, depending on the type of offal being processed.

The oven has a power output of 10 to 60 kw and comprises between 2 and 48 microwave generators. The length of the tunnel is normally between 3 and 10 m. The oven is preferably operated at a frequency of 915 MHz, although a 2450 MHz oven could also be used.

Cubes between 1 and 8cm$^3$ in volume are normally produced. These cubes are intended to be incorporated in terrines or any other animal food product in quantities of 30 to 60%, the terrines finally being sterilized.

The invention is described further with reference to the accompanying drawings.

DETAILED DESCRIPTION OF THE DRAWINGS

Figure 1:
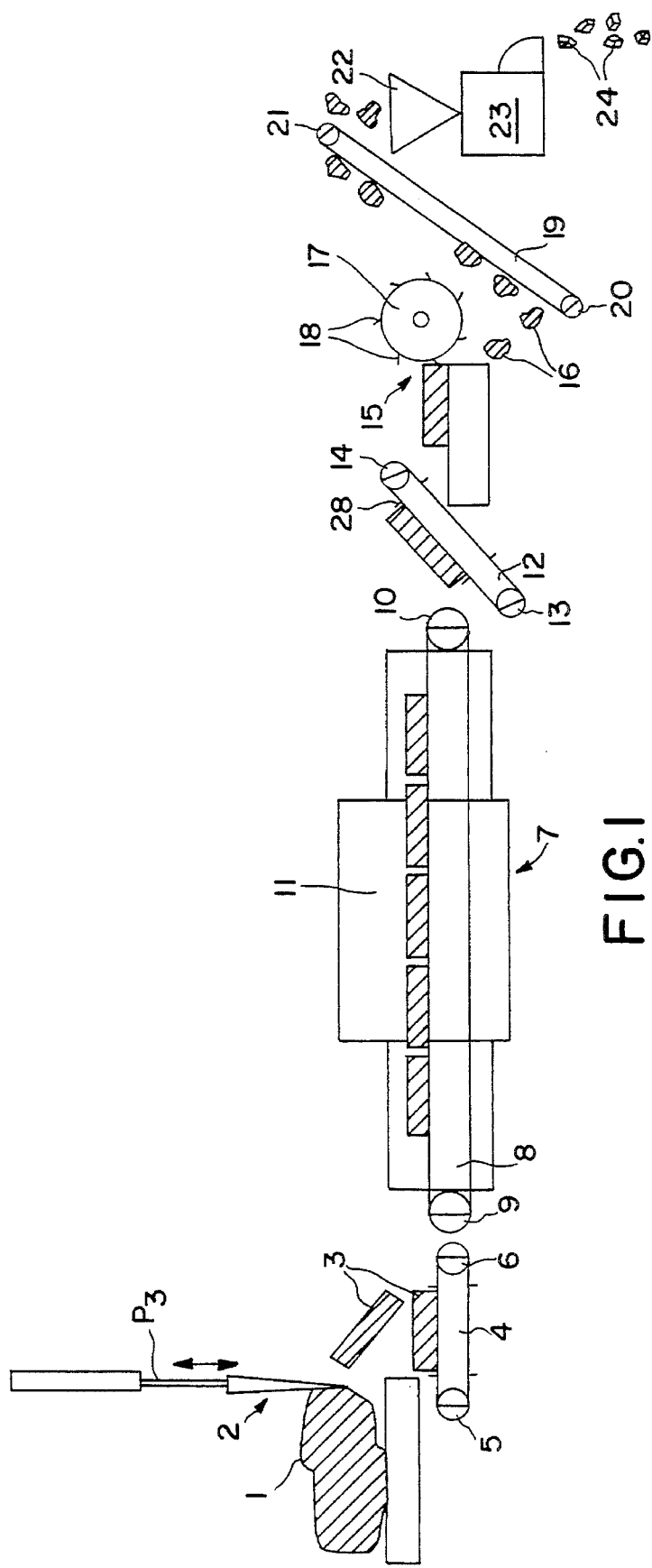
FIG. 1 diagrammatically illustrates a machine according to the invention.

As illustrated in FIG. 1, the frozen loaf (1) arrives at the slicing unit (2) comprising a piston P$_3$ having a blade. The slice (3) drops onto a conveyor comprising a belt (4) having stops and drive rollers (5) and (6). The slice is carried into the microwave tunnel (7) by a conveyor comprising a belt (8) and drive rollers (9,10). The tunnel comprises a microwave applicator (11). On leaving the tunnel, the slice is transferred to another conveyor belt (12) with stops and drive rollers (13,14). It drops into the working plane of the chipping unit (15) for size-reduction to chips (16). This unit (15) comprises a drum (17) equipped with-blades (18). The chips are then taken up by a conveyor comprising belt (19) with stops and drive rollers (20,21). These chips then drop into the feed hopper (22) of the cubing unit (23), and the end product leaves in the form of cubes (24), the cubes thus being ready for use, for example in terrines or pates.

Figure 2:
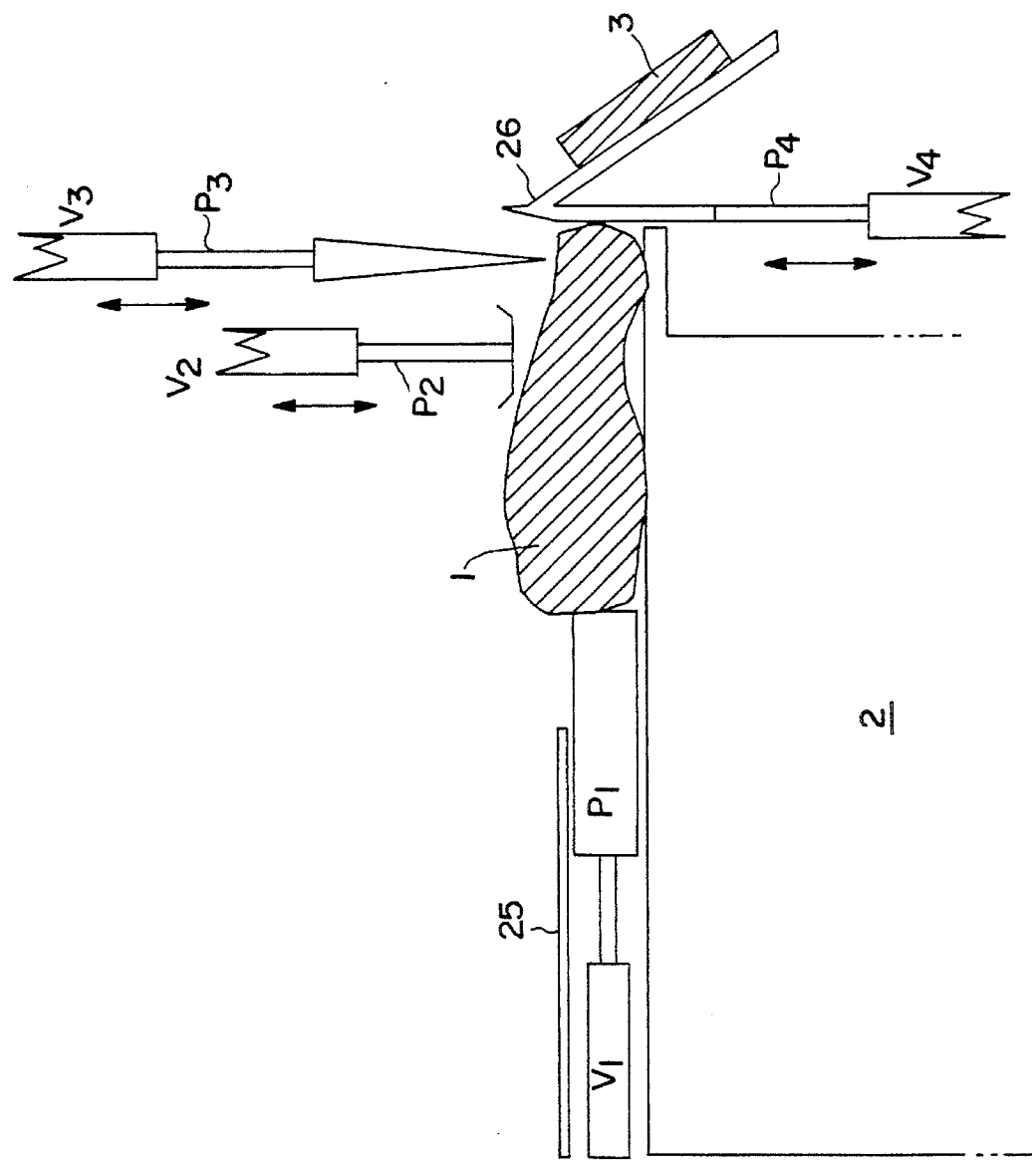
FIG. 2 diagrammatically illustrates a slicing unit.

Referring to FIG. 2, the slicing unit (2) comprises four jacks $V_1$, $V_2$, $V_3$ and $V_4$ and their associated pistons $P_1$, $P_2$, $P_3$ and $P_4$. When the feed loaf (1) has fallen into the feed magazine beneath the protective casing (25), the jack $V_1$ pushes the pressure piston ($P_1$) against the loaf of meat (1) which is itself held against the front retaining grill of piston ($P_4$). The jack $V_2$ then pushes the retaining plate of piston ($P_2$)to flatten the loaf.

Figure 3:
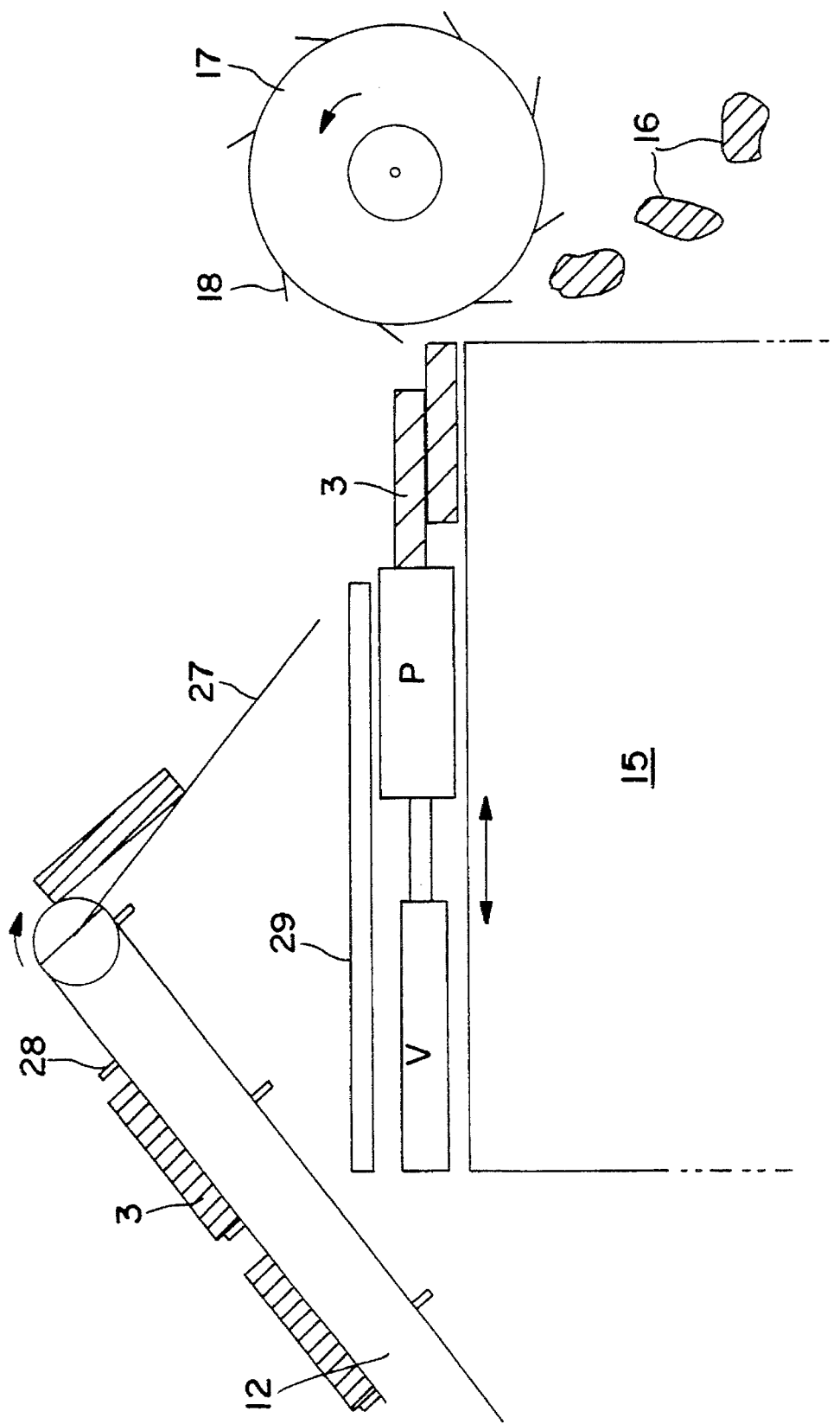
FIG. 3 diagrammatically illustrates a chipping unit.

A blade of piston $P_3$ under pressure of jack $V_3$ descends and slices a slice (3) of loaf (1). Each of pistons $P_2$, $P_3$ and $P_4$ retract, and piston $P_1$ pushes the loaf and slice so that the slice drops onto discharge slope (26) and onto conveyor (4) which transports the slice to a second conveyor (8) which, in turn, transports the slice into the microwave tunnel (7). Piston $P_4$ then returns to position the retaining grill in the path of the loaf, piston $P_1$ pushes the loaf against the retaining grill, and piston $P_2$ descends to push retaining plate to flatten the loaf after which, piston $P_3$ descends and the blade slices another slice from the loaf. As illustrated in FIG. 3, the chipping unit (15) is fed by slices (3) the conveyor belt (12) having stops (28). The slices (3) drop onto the entry slope (27) to the feed magazine. A jack V and the associated piston P are situated beneath the protective casing (29). The speed of rotation of the drum (17) may be selected. Around its periphery, the drum (17) comprises slicing blades (18) which nibble the slices of (3) tempered between –5 and –9° C. by the microwaves.

The blades are positioned to cover the entire width of the drum. The drum can thus be fed over its entire width. The drum (17) rotates in the arrowed direction, and the jack V actuates the piston P which pushes the slices against the rotating drum.

Figure 4:
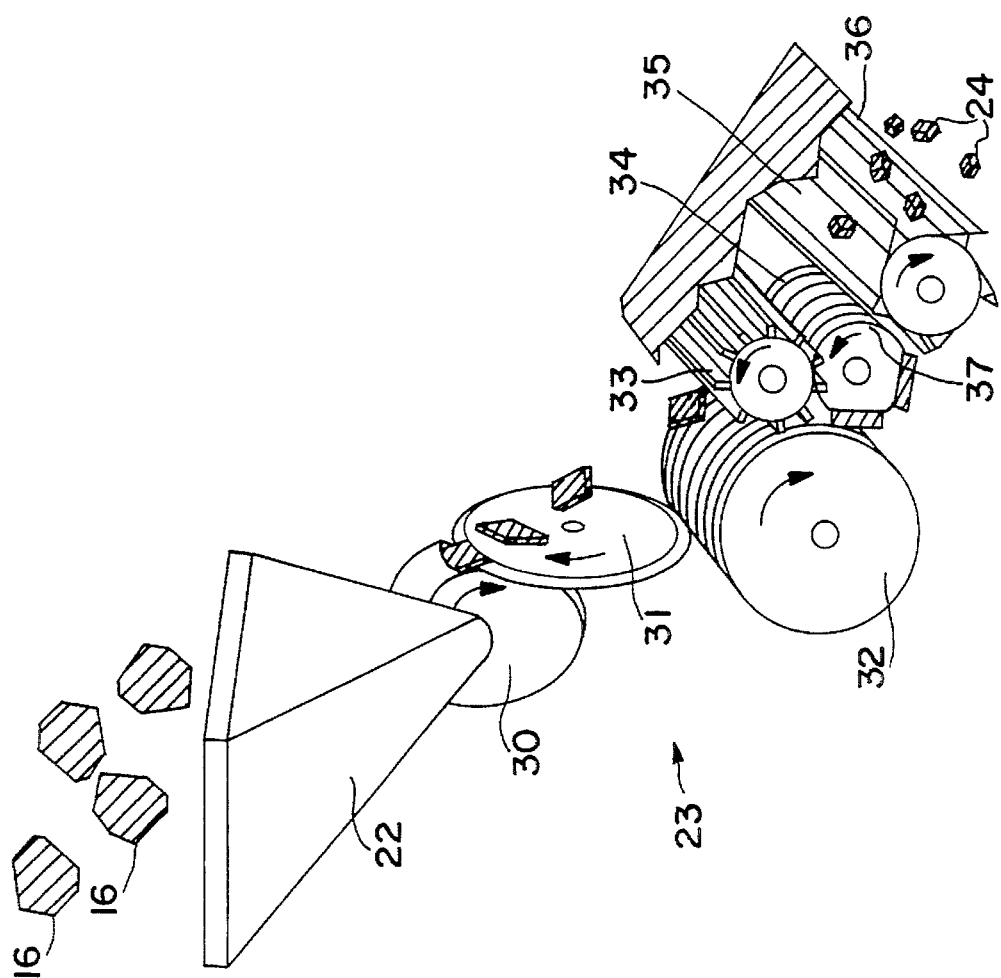
FIG. 4 diagrammaticially illustrates a cubing unit.

The drum nibbles the slices by the action of the blades (18) so that the chips (16) are obtained. When the piston P has completed its stroke, it returns to the rear to allow the magazine to be fed. The chips (16) are then taken up by the conveyor belt (19) (FIG. 1) which carries them to the feed hopper (22) of the cubing unit (23) (FIG. 4). The chips (16), a few cm thick and as wide as a hand, are carried by the hopper (22) of the cubing unit (23) to the feed turbine (30) of the cubing unit. Centrifuged, the chips force their way into the opening and are cut by the circular slicing blade (31) of large dimensions. The flakes thus formed drop onto a grooved, rotating feed drum (32) which propels them against the feed roller (33) and which drives them onto the shaft (34) equipped with parallel circular rotating blades (37). The flakes are sliced longitudinally into thin strips. The strips are then taken up by the shaft (35) which rotates in the opposite direction to the shaft (34) and which cuts them into small cubes (24) by blades (36), and the cubes are expelled from the cubing unit.

Figure 5:
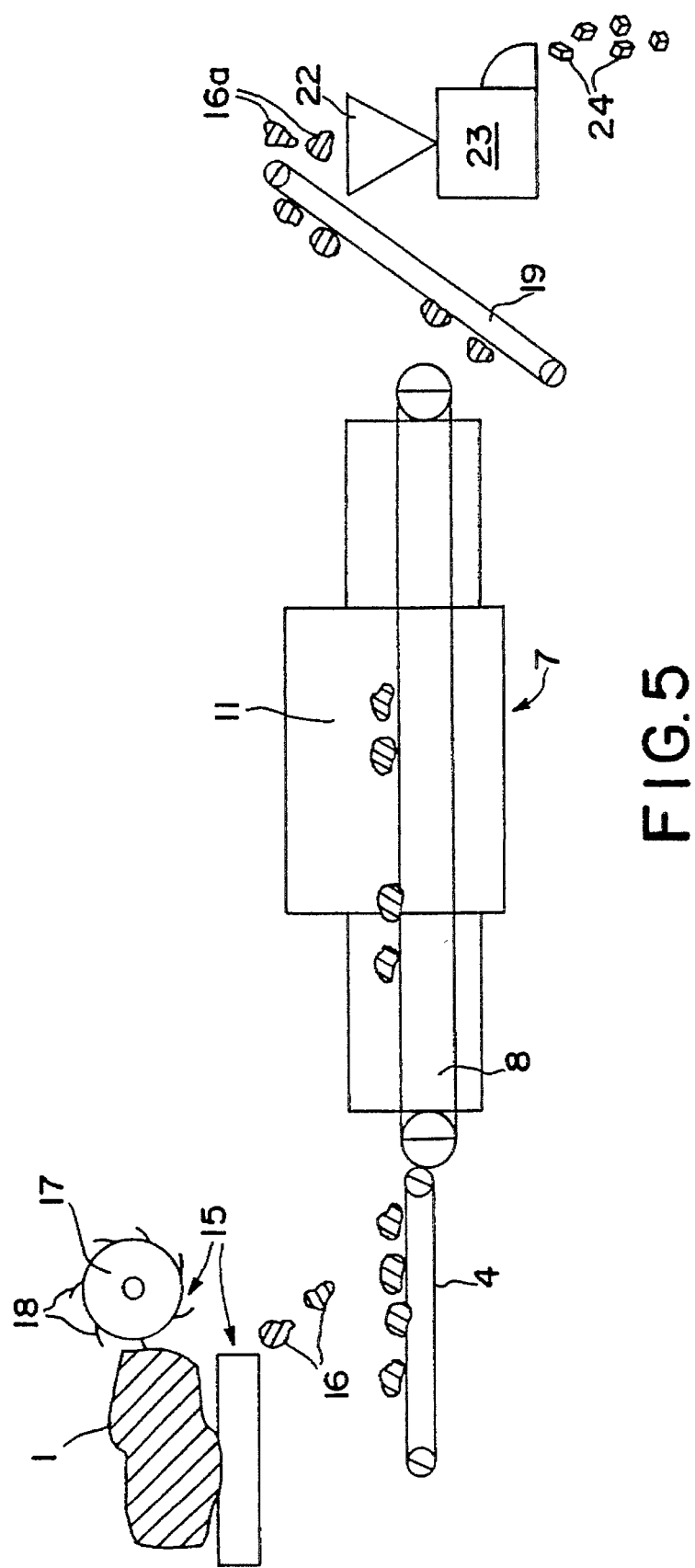
FIG. 5 illustrates a further machine according to the invention.

FIG. 5 illustrates an apparatus assembly having, successively positioned, a chipping unit (15), a microwave tunnel oven (7) and a cubing unit (23), the tunnel oven having a tunnel oven conveyor (8) and a microwave applicator (11). The chipping unit (15), having a drum (17) and blades (18), is positioned for size-reducing a loaf (1) of frozen offal into chips (16), the microwave tunnel oven (7) is positioned for receiving the chips for heating the chips to heat-temper the chips, and the cubing unit (23) is positioned for receiving the heat-tempered chips (16a) for size-reducing the heat-tempered chips into cubes (24). A first conveyor (4) for conveying the chips extends between chipping unit (15) and the tunnel oven (7) and its conveyor (8), and a second conveyor (19) for conveying the heat-tempered chips extends from the tunnel oven (7) and its conveyor (8) to cubing unit (23).

EXAMPLE

The starting material consists of frozen loaves of liver weighing 30 kg and arriving at a temperature of –17°C. The slicer used is of the type manufactured by the Magurit company which produces 60 mm thick slices. These slices are carried through a tunnel 5 m in length by a conveyor belt advancing at a speed of 1.1 m/min. The microwave tunnel comprises 48 generators delivering a power output of 19.2 KW. The slices leave the tunnel with a temperature of –8° C. and are carried to a "Starcutter" chipping unit of the type manufactured by the Magurit company. The chips then arrive at a cubing unit (manufacturer: Urschel) which produces 2–3cm$^3$ cubes at a rate of 1350 kg/h.

We claim:

1. A process for obtaining cubes of offal comprising:

slicing a loaf of offal having a temperature no higher than –10° C. to obtain slices having a thickness of between 6 cm and 15 cm; and passing the slices through a microwave tunnel oven to heat-temper the slices so that upon leaving the oven, the heat-tempered slices have a temperature of from –5° C. to –9° C.; and size-reducing the heat-tempered slices to chips and then size-reducing the chips to cubes.

2. A process according to claim 1 wherein the chips have a temperature of from –3° C. to –6° C. when they are size-reduced to cubes.

3. A process according to claim 1 or 8 wherein the loaf has a temperature of from –24° C. to –10° C.

4. A process according to claim 1 or 8 wherein the slices are size-reduced to chips having a thickness of from 1 cm to 3 cm and the chips are size-reduced to cubes having a volume of between 1 cm$^3$ and 8 cm$^3$.

5. A process according to claim 1 wherein the chips are size-reduced to cubes having a volume of between 1 cm$^3$ and 8 cm$^3$.

6. A process for obtaining cubes of offal comprising size-reducing a loaf of offal having a temperature no higher than –10° C. to chips and passing the chips through a microwave tunnel oven to heat-temper the chips so that upon leaving the oven, the heat-tempered chips have a temperature of from –4° C. to –6° C., and size-reducing the heat-tempered chips to cubes.

7. A process according to claim 6 wherein the heat-tempered chips have a temperature of from –3° C. to –6° C. when they are size-reduced to cubes.

8. A process according to claim 6 or 7 wherein the loaf has a temperature of from –24° C. to –10° C.

9. An apparatus assembly for preparing offal cubes comprising in successive position, a first unit having a blade for slicing a loaf of frozen offal, a microwave tunnel oven for receiving and heating the slices to heat-temper the slices, a chipping unit for receiving and size-reducing the heat-tempered slices into chips, a cubing unit for receiving and size-reducing the chips into cubes, and comprising a first conveyor extending between the slicing unit and the tunnel oven for conveying the slices from the slicing unit to the tunnel oven, a second conveyor extending between the tunnel oven and the chipping unit for conveying the heat-tempered slices from the tunnel oven to the chipping unit and a third conveyor extending between the chipping unit and the cubing unit for conveying the chips from the chipping unit to the cubing unit.

10. An apparatus assembly for preparing cubes of offal comprising in successive position, a chipping unit for size-reducing a loaf of frozen offal into chips, a microwave tunnel oven for receiving and heating the frozen chips to heat-temper the chips and a cubing unit for receiving and size-reducing the heat-tempered chips into cubes, and comprising a first conveyor extending between the chipping unit and the tunnel oven for conveying the chips from the chipping unit to the tunnel oven and a second conveyor extending between the tunnel oven and the cubing unit for conveying the tempered chips from the tunnel oven to the cubing unit.

* * * * *

UNITED STATES PATENT AND TRADEMARK OFFICE
CERTIFICATE OF CORRECTION

PATENT NO. : 5,464,641                    page 1 of 3
DATED : November 7, 1995
INVENTOR(S) : Guyot, et al.

It is certified that error appears in the above-indentified patent and that said Letters Patent is hereby corrected as shown below:

On the title page, in line 6 of the text of the Abstract, "ten" should be --then--, Column 1, line 5, after "to", insert --cutting--, Column 1, line 27, after "provides", insert --a--,

UNITED STATES PATENT AND TRADEMARK OFFICE
CERTIFICATE OF CORRECTION

PATENT NO. : 5,464,641
DATED : November 7, 1995
INVENTOR(S) : Guyot, et al.

It is certified that error appears in the above-indentified patent and that said Letters Patent is hereby corrected as shown below:

Column 1, line 30/31, before "are", delete "of"

Column 3, line 21, delete "by" and then, after "(3)", insert --by--,

Column 3, line 27, delete "of",

Column 3, line 29, after "blades", insert --(18)--,

UNITED STATES PATENT AND TRADEMARK OFFICE
CERTIFICATE OF CORRECTION

PATENT NO. : 5,464,641
DATED : November 7, 1995
INVENTOR(S) : Guyot, et al.

It is certified that error appears in the above-indentified patent and that said Letters Patent is hereby corrected as shown below:

Column 4, lines 32 (line 1 of claim 3), delete "8" and insert therefor --2--;

Column 4, line 34 (line 1 of claim 4), delete "8"

Signed and Sealed this

Twenty-eighth Day of May, 1996

Attest:

BRUCE LEHMAN

*Attesting Officer*  *Commissioner of Patents and Trademarks*